United States Patent [19]

Sommer et al.

[11] 3,919,240

[45] Nov. 11, 1975

[54] QUATERNARY QUINUCLIDINONES

[76] Inventors: Harold Z. Sommer, 719 Lewis St., Havre de Grace, Md. 21078; Jacob I. Miller, 3401 Merle Drive, Baltimore, Md. 21207

[22] Filed: Aug. 17, 1966

[21] Appl. No.: 573,131

[52] U.S. Cl. .......... 260/293.53; 424/267

[51] Int. Cl.$^2$ .......... C07D 211/94

[58] Field of Search .......... 260/294.7 B, 293.53; 167/46 A, 47; 424/267

[56] References Cited

UNITED STATES PATENTS 2,834,779 5/1958 Biel et al. .......... 260/294.7

OTHER PUBLICATIONS

Mosby, Heterocyclic Systems With Bridgehead Nitrogen Atoms, part Two, Interscience Publishers, Inc., New York, 1961, pp. 1348–1356.

*Primary Examiner*—Leland A. Sebastian
*Attorney, Agent, or Firm*—Nathan Edelberg; Robert P. Gibson; Robert W. Church

[57] ABSTRACT

New incapacitating chemical compounds useful as chemical warfare agents which are produced by quaternizing quinuclidinone with a dihaloalkane.

6 Claims, No Drawings

QUATERNARY QUINUCLIDINONES

This invention relates to the synthesis of new incapacitating chemical compounds which are useful as chemical warfare agents. More particularly, our invention is concerned with novel compounds produced by quaternizing a quinuclidinone with a dihaloalkane.

Our chemical agents act mostly on the peripheral autonomic cholinergic nervous system which includes the motor nerves, all preganglionic fibers and the postganglionic parasympathetic fibers. The transmission of impulses along a nerve or from nerve fibers to muscle fibers or secretory cells or from one nerve fiber to another across synapses in ganglia is thought to involve chemical changes either directly or as the source of potential differences. Our chemical agents interfere with the normal process of neuromuscular impulse transmission and thus modify or disrupt the propagation of impulses from nerves to muscles. We have also found these compounds to produce incapacitation effects such as decreased locomotor activity and increased sensitivity to touch at relatively low dose levels in various animals.

The object of this invention is to synthesize new incapacitating agents in high yields wherein said products, are well suited for industrial scale manufacture.

Other objects of and uses for the invention will in part be obvious and will in part appear hereinafter in the following detailed description thereof.

Our compounds are useful as chemical warfare agents and as potential otherwise physiologically active materials.

Our compounds may be utilized in any munitions suitable for handling a relatively non-volatile incapacitating agent such as bombs, shells, spray tanks, rockets, missiles, aerosol generators, and others.

In accordance with the invention, a solution of 3-quinuclidinone and $\alpha,\omega$-dihaloalkane in a solvent were heated in an open beaker on a steam bath. On evaporation of a majority of solvent a vigorous reaction ensued. The steam bath was removed and a solvent was added to the hot mixture. After cooling to room temperature, a crystalline material formed and was collected on a filter. A pure product was produced after recrystallizing from a solvent in the presence of charcoal.

The new compounds of the present invention may be represented by the following general formula:

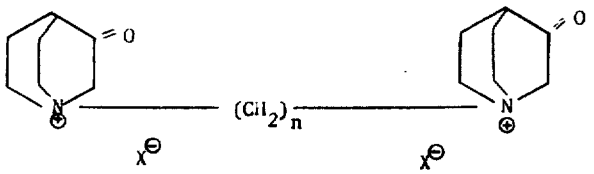

where $n$ is 5 to 16 carbon atoms and where X is one equivalent of a monovalent or polyvalent anion.

The procedure used for the preparation of the new incapacitating materials is schematically shown as follows:

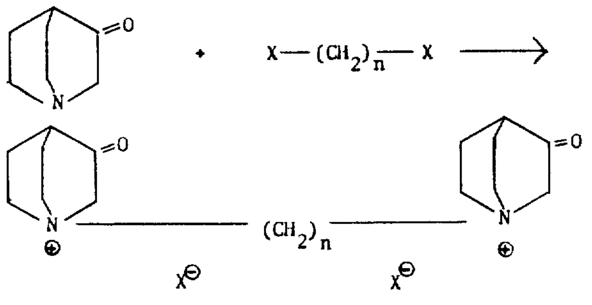

where $n$ is the same as above, X is a halide radical and $X^-$ is the corresponding halide anion, preferably chlorine, bromine, or iodine.

In the above reaction, we have found that the incoming $\alpha$, $\omega$-dihaloalkane adds to the nitrogen atom. If compounds are desired in which X is other than a halide ion, the above quaternary compounds are treated with the desired acid by a simple exchange reaction as set forth below.

EXAMPLE

A solution of 3-quinuclidinone (1.5g.) and 1,10-dibromodecane (0.9g.) in 50 ml. of acetone were heated in an open beaker on a steam bath. After most of the solvent was evaporated, there followed a vigorous reaction. The steam bath was removed and acetone was added to the hot mixture. After cooling to room temperature, the crystalline material (1.21g.) was collected on a filter. The pure product, decamethylenebis-(3-oxoquinuclidiniumbromide, was obtained after recrystallization from ethanol-ethyl acetate (with charcoal). The compound melted at 273°–275°.

Anal. Calcd. for $C_{24}H_{42}N_2O_2Br_2.H_2O$: C, 50.7; H, 7.75; O, 8.4; Br, 28.17. Found: C, 50.3; H, 8.15; O, 8.7; Br, 27.7.

| | | | |
|---|---|---|---|
| Iv | $MED_{50}$ | in mice | 0.056 mg/kg |
| Iv | $LD_{50}$ | in mice | 2.24 mg/kg |

$$\frac{LD_{50}}{MED_{50}} = 39.9$$

Compounds that are representative of our invention are listed below by name.

Pentamethylene-bis-(3-oxoquinuclidiniumbromide)
Hexamethylene-bis-(3-oxoquinuclidiniumbromide)
Heptamethylene-bis-(3-oxoquinuclidiniumbromide)
Octamethylene-bis-(3-oxoquinuclidiniumbromide)
Nonamethylene-bis-(3-oxoquinuclidiniumbromide)
Decamethylene-bis-(3-oxoquinuclidiniumbromide)
Undecamethylene-bis-(3-oxoquinuclidiniumbromide)
Dodecamethylene-bis-(3-oxoquinuclidiniumbromide)
Tridecamethylene-bis-(3-oxoquinuclidiniumbromide)
Tetradecamethylene-bis-(3-oxoquinuclidiniumbromide
Pentadecamethylene-bis-(3-oxoquinuclidiniumbromide)
Hexadecamethylene-bis-(3-oxoquinuclidiniumbromide)

We have shown a preferred compound in which the anion is limited to the halogen moiety, in particular the bromide, since the bromoalkanes are readily available and are good quaternizing agents. In general, however, it is only necessary that the anions merely have to meet the requirement of being capable of forming a stable salt with the quaternary nitrogen. Thus, the halogen ions can be exchanged with other anions of a relatively strong monovalent or polyvalent acids by conventional methods. For example, if X is a bromide in the final product, a solution of the compound can be treated with a basic ion exchange resin or mixed with silver oxide and subsequently the desired acid is added to the quaternary hydroxide solution. Anions other than the halogens may be supplied directly or by metathesis with the halide form of the quaternary ammonium compound. Also, suitable as representations of $X^-$ are the anions hydrogen sulfate, hydrogenoxalate, and perchlorate. Representative examples of these additional monovalent or polyvalent end products are:

Decamethylene-bis-(3-oxoquinuclidinium hydrogen sulfate).

Decamethylene-bis-(3-oxoquinuclidinium nitrate).

Decamethylene-bis-(3-oxoquinuclidinium hydrogen oxalate).

Decamethylene-bis-(3-oxoquinuclidinium perchlorate).

We claim:

1. Compounds having the formula:

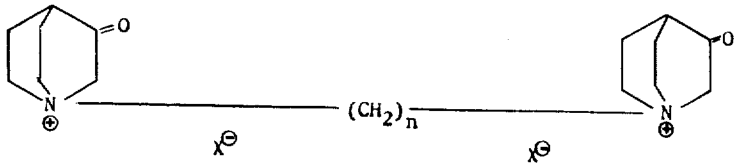

where *n* is 5 to 16 and where X is one equivalent of a non-toxic monovalent or polyvalent anion selected from the group of anions consisting of halide, hydrogen sulfate, hydrogen oxalate, nitrate, and perchlorate.

2. The compound Octamethylene-bis-(3-oxoquinuclidiniumbromide).

3. The compound Nonamethylene-bis-(3-oxoquinuclidiniumbromide).

4. The compound Decamethylene-bis-(3-oxoquinuclidiniumbromide).

5. The compound Undecamethylene-bis-(3-oxoquinuclidiniumbromide).

6. The compound Dodecamethylene-bis-(3-oxoquinuclidiniumbromide).

* * * * *